(12) United States Patent
Wu et al.

(10) Patent No.: US 7,885,675 B2
(45) Date of Patent: Feb. 8, 2011

(54) METHOD AND APPARATUS FOR PROVIDING VOICE MAILBOX FUNCTION IN POC SERVICE

(75) Inventors: Xugang Wu, Shenzhen (CN); Zheng Wang, Shenzhen (CN); Shengting Zhang, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 474 days.

(21) Appl. No.: 11/959,318

(22) Filed: Dec. 18, 2007
(Under 37 CFR 1.47)

(65) Prior Publication Data
US 2008/0299950 A1 Dec. 4, 2008

Related U.S. Application Data

(63) Continuation of application No. PCT/CN2006/003248, filed on Dec. 1, 2006.

(30) Foreign Application Priority Data

Dec. 2, 2005 (CN) .................. 2005 1 0126637

(51) Int. Cl.
*H04L 12/58* (2006.01)
*H04B 7/00* (2006.01)
*H04M 3/42* (2006.01)

(52) U.S. Cl. .............. 455/519; 455/518; 455/416; 455/412.1

(58) Field of Classification Search ........ 455/412.1, 455/412.2, 414.1, 466, 517, 518, 519
See application file for complete search history.

(56) References Cited

U.S. PATENT DOCUMENTS

| 6,711,011 | B2* | 3/2004 | Lee .................... 361/679.6 |
| 7,107,017 | B2* | 9/2006 | Koskelainen et al. ....... 455/90.2 |
| 7,203,509 | B2* | 4/2007 | Gottschalk et al. .......... 455/518 |
| 2005/0164681 | A1 | 7/2005 | Jenkins et al. ........... 455/412.1 |
| 2005/0164682 | A1 | 7/2005 | Jenkins et al. ........... 455/412.1 |
| 2006/0171351 | A1* | 8/2006 | Wild et al. ................. 370/328 |
| 2006/0205427 | A1* | 9/2006 | Laible et al. ................ 455/518 |

FOREIGN PATENT DOCUMENTS

| CN | 1369999 A | 9/2002 |
| CN | 1658631 A | 8/2005 |
| JP | 2005234666 A | 9/2005 |
| WO | 2005055639 A1 | 6/2005 |

* cited by examiner

*Primary Examiner*—Tilahun Gesesse
(74) *Attorney, Agent, or Firm*—Ladas & Parry, LLP

(57) ABSTRACT

A method of providing a voice mailbox function in a PoC service, including: if the voice mailbox of at least one called user is to be connected in response to receiving a session establishment request from a calling user, determining whether the session corresponding to the session establishment request is a one-to-many session; and recording a message from the calling user through the voice mailbox if the session is a one-to-many session. The invention further discloses a method in a PoC service of notifying of a message in a voice mailbox, and a PoC service server.

6 Claims, 4 Drawing Sheets

US 7,885,675 B2

METHOD AND APPARATUS FOR PROVIDING VOICE MAILBOX FUNCTION IN POC SERVICE

CROSS REFERENCES TO RELATED APPLICATIONS

The present application is a continuation of PCT Application No. PCT/CN2006/003248, filed on Dec. 1, 2006, which claims the benefit from Chinese Patent Application CN200510126637.6, filed in the China Patent Office on Dec. 2, 2005, the entire contents of which being incorporated herein by reference.

FIELD OF THE INVENTION

The present invention relates to PoC (Push-To-Talk over Cellular) services in the field of communications, and in particular, to a method of and an apparatus for providing a voice mailbox function in the PoC services.

BACKGROUND OF THE INVENTION

PoC service is a half-duplex communication based on VOIP, and is capable of supporting one-to-one or one-to-many sessions. A session initiator may initiate a session with a group of users via a group ID or a list of called users. During the session, only one user is permitted to speak at one time. A user may acquire a floor by submitting a request and then obtaining a grant from a server.

A PoC system includes at least one PoC server and PoC clients. The PoC clients reside in mobile terminals and are adapted to access the PoC service. The PoC server provides the PoC service with network functions of application layer, and may be classified as a PoC control server or a PoC participation function server by its functions. The PoC control server provides functions such as centralized PoC session manipulation, media distribution, Talk Burst control and so on. The PoC control server does not communicate with the PoC clients directly, and instead, interacts with the PoC clients via the PoC participation function server.

The PoC service provides supports for a user to send personal instant notification messages. In such a way, a sender may express his/her desire to establish a one-to-one PoC session with a particular party. When the party receives the message, the session with the sender sending the personal instant message may be established by simply pressing a key.

There are some PoC service settings in the PoC service, including Instant Personal Alert Barring (IAB), Incoming Session Barring (ISB), etc. The IAB serves to reject personal instant notification messages received from the network side, whereas the ISB serves to reject calls received from the network side. Users present these settings to the participation function server when starting their PoC terminals.

PoC voice mailbox is one of system functions, in the PoC service, for answering a session on behave of a called user in the case that he/she is not accessible (no reply or busy). The access to a PoC voice mailbox is similar to a PoC client. A user may also leave a message in his/her voice mailbox prior to a session, so that other users who then call him/her will receive the message. If someone leaves a message in the user's voice mailbox, the number of existing voice messages will be displayed on the terminal, and then, the user may receive the messages by accessing his/her voice mailbox.

In the case that a voice message exits, the PoC server initiatively initiates a session between the PoC user and his/her voice mailbox, so that the PoC user may receive the message in the voice mailbox.

The prior art has the following deficiencies:

1) Existing voice mailboxes are designed only for one-to-one sessions, and always play a voice prompt when they are connected to. In practical applications, however, a one-to-many session is implemented in many scenarios, in which case many voice mailboxes will be connected to. In the case of one-to-many session, it is time consuming and not a good experience for users (e.g., all the users online will hear the voice prompt) if the voice prompt is present for each accessed mailbox as in a one-to-one session.

2) Because of the manner of direct telephone calls adapted in case of voice message in the prior art, a user cannot be notified at all if he/she has set the ISB on.

3) The user has to receive the voice message via a telephone call in the PoC service, resulting inconvenience for the user and inadequate utilization of the PoC service resources.

SUMMARY OF THE INVENTION

An embodiment of the invention provides a method and an apparatus for providing a voice mailbox function in a PoC service, so as to enable a voice mailbox function with improved user experience in a one-to-many session.

Another embodiment of the invention provides a method in a PoC service of notifying that a message has been left in a voice mailbox, so as to enable a timely notification to a user in response to a new message generated in the voice mailbox, with Personal Alert Barring being set by the user.

The embodiments of the invention provide the following technical solutions.

A method of providing a voice mailbox function in a PoC service, including: if a voice mailbox of at least one called user is to be connected in response to receiving a session establishment request from a calling user, determining whether the session corresponding to the session establishment request is a one-to-many session; and recording a message from the calling user through the voice mailbox if the session is a one-to-many session.

A method in a PoC service of notifying of a message generated in a voice mailbox, including: in response to leaving a message in a voice mailbox, determining whether an instant notification is disabled with respect to the voice mailbox; and if the instant notification is disabled, sending a text notification message to a called user corresponding to the voice mailbox.

A PoC service server includes: a communication module, for receiving and transmitting messages; a control module, for determining whether to connect to the voice mailbox of at least one called user in response to receiving a session establishment request from a calling user, and for managing the communication module to send a session request to the voice mailbox; a determination module, for determining whether the session is of one-to-one session type or one-to-many session type in response to receiving a response message from the voice mailbox; and a processing module, for managing the voice mailbox to record a message left by the calling user if the user selects to leave a message or if the session is of one-to-many session type, or to terminate the session with the voice mailbox if the calling user selects to leave no message.

A PoC service server includes: a communication module, for receiving and transmitting messages; a control module, for determining whether to connect to a voice mailbox of at least one called user in response to receiving a session establishment request from a calling user, and for managing the communication module to send a session request to the voice mailbox; a processing module, for performing control so that the calling user can leave a message to the voice mailbox in response to receiving a response message; and a determination module, for determining whether the called user bars an instant notification in response to a new message recording generated in the voice mailbox, and if the instant notification is barred, the communication module being managed to send a text notification message to the called user.

The embodiments of the invention provide the following benefits:

1) According to an embodiment of the invention, whether to present a voice prompt to the user depends on the session type (i.e., one-to-one or one-to-many), so that it is possible to prevent the user experience from being affected by the playback of the voice prompt in the case of one-to-many session.

2) According to an embodiment of the invention, because the user can be notified via an instant notification message or a text message in response to a new message recording generated in the voice mailbox, the instant notification can be achieved even when the user sets the ISB. Because the notification message includes a voice mailbox ID, the user can access the voice mailbox to receive the message by pressing a key. Therefore, it is very convenient for the user.

DETAILED DESCRIPTION OF THE EMBODIMENTS

To prevent the user experience from being affected by playback of the voice prompt in the scenario of one-to-many session in the PoC service, according to an embodiment of the invention, the PoC server determines the type of the present session in response to receiving a response message from a voice mailbox. Depending on whether the session is a one-to-one session or a one-to-many session, the PoC server does not play the voice prompt to the calling user if the session is a one-to-many session.

Figure 1:
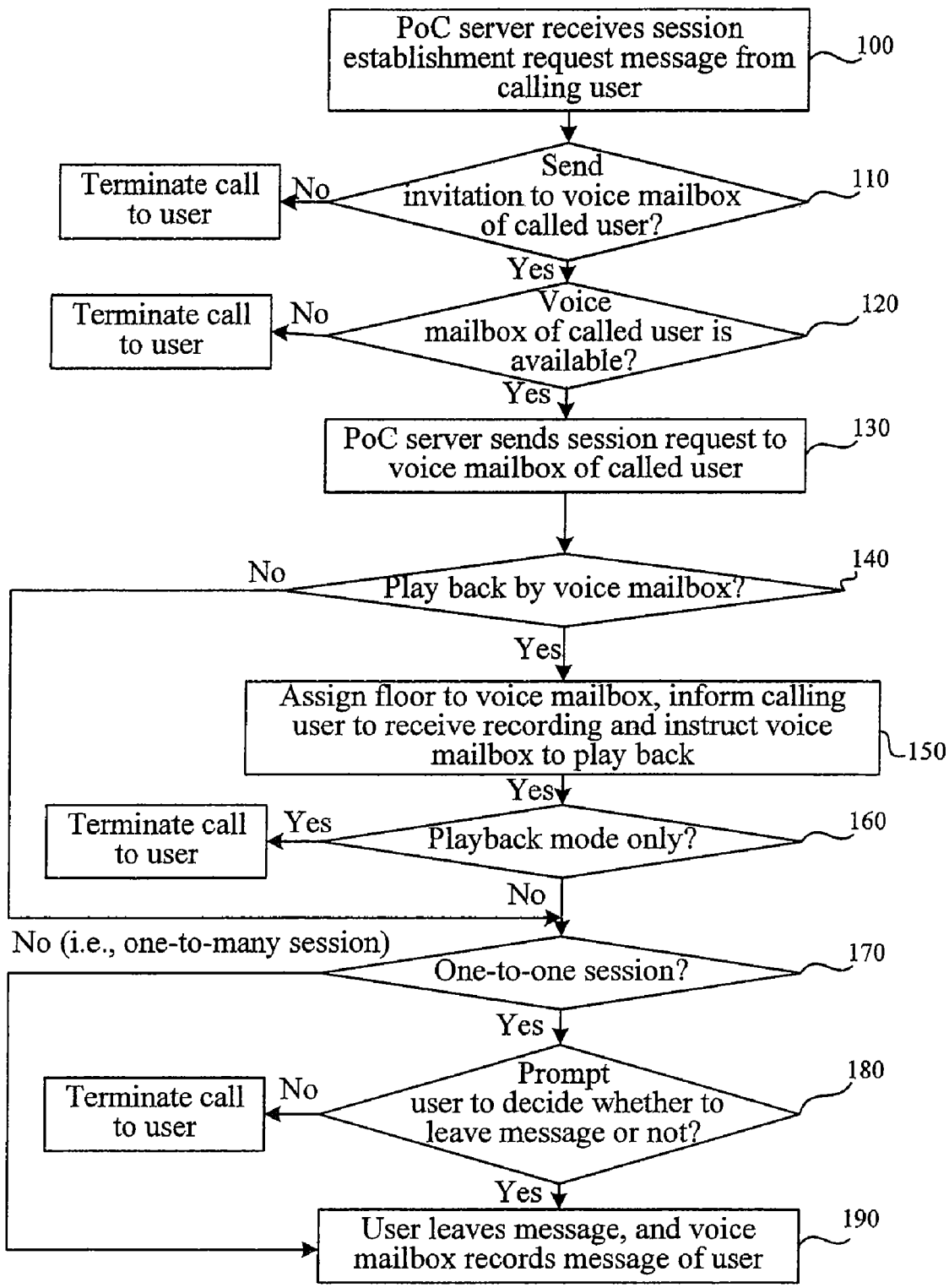
FIG. 1 is a flow chart of a method of providing a voice mailbox function according to an embodiment of the invention.

Referring to FIG. 1, a method in which a calling user leaves a message to the voice mailbox is described as follows.

At process 100, the PoC server receives a session establishment request message from a calling user.

The called ID in the session establishment request message may contain only one resource ID (URI), or may contain a list of called URIs or the URI of a group. The PoC server determines all the called users involved in the session request from all the URIs.

At process 110, the PoC server processes the request and determines whether to send an invitation to the voice mailbox of a called user. If yes, the method proceeds to process 120; otherwise, the call to this user is terminated.

The determination may be made based on whether the called terminal is turned off, whether the called user starts his/her PoC service, whether the called user sets the ISB, whether the called user is in a session and the number of concurrent sessions where the called user presents reaches its maximum value, whether the called user is busy or whether the called user forwards incoming calls to his/her voice mailbox, etc.

At process 120, whether the called user's voice mailbox is available (for example, whether the called user activates a voice mailbox, whether the called user bars the voice mailbox temporarily, etc) is determined. If yes, the method proceeds to process 130; otherwise, the call to the called user is terminated.

At process 130, the PoC server sends a session request to the voice mailbox of the called user.

At process 140, in response to receiving a response message from the voice mailbox, the PoC server determines whether the voice mailbox plays a voice recording set by the called user based on the response message from the voice mailbox. If yes, the method proceeds to process 150; otherwise, the method proceeds to process 170.

Usually, the response message from the voice mailbox carries information indicating whether to play the voice recording set by the owner of the voice mailbox, information indicative of the access mode of the voice mailbox, etc. The access mode includes playback only, recording only, and a combination of playback and recording.

At process 150, a floor is assigned to the voice mailbox, the calling user is notified to receive the voice recording and the voice mailbox is instructed to play the voice recording.

At process 160, a determination is made as to whether the voice mailbox is in the playback only mode, after the voice mailbox plays the voice recording. If yes, the session with the voice mailbox is terminated, and the call to the called user is also terminated; otherwise, the method proceeds to process 170.

At process 170, the PoC server determines the type of the present session based on the number of called users involved in the session establishment request message from the calling user. If the session is a one-to-one session, the method proceeds to process 180; if the session is a one-to-many session, the method proceeds to process 190.

At process 180, the PoC server plays a voice prompt to the calling user for asking whether the calling user wants to leave a message to the voice mailbox of the called user. If the user selects Yes, the method proceeds to process 190; otherwise, the session with the voice mailbox is terminated, and the call to the called user is also terminated.

At process 190, the calling user leaves a message which is recorded by the voice mailbox.

For the owner of the voice mailbox to be timely informed that there is a new message generated in the voice mailbox even if the ISB is set, an embodiment of the invention employs an instant notification message or a text message to notify the owner in response to the new message.

Preferably, the notification message carries an ID of the voice mailbox and a data ID of the new message. In response to the user selecting to receive the message through a selection key, the user terminal establishes a session connection with the voice mailbox based on the ID of the voice mailbox, so that the voice mailbox plays a specified message.

Figure 2:
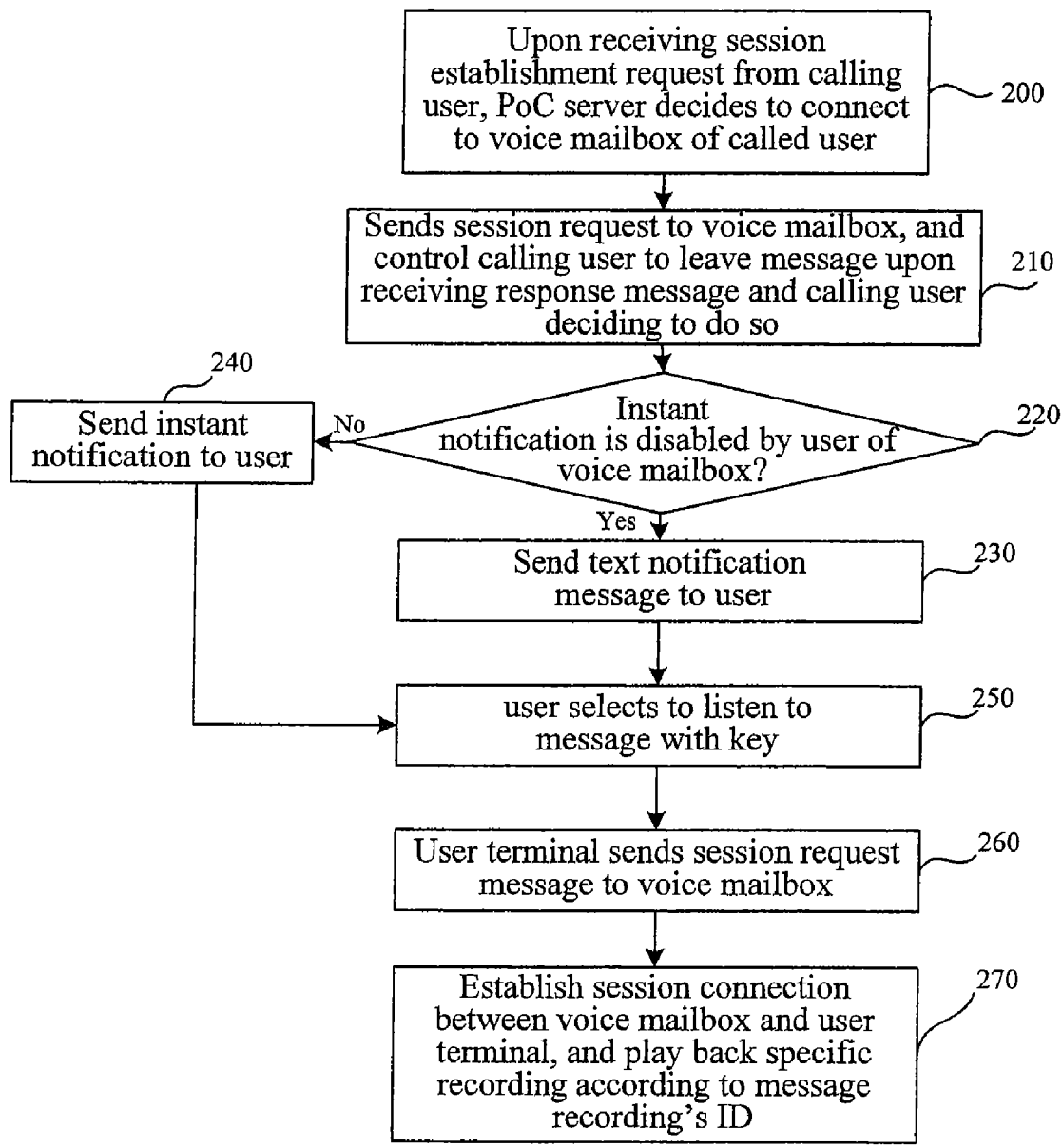
FIG. 2 is a flow chart of a method of notifying the user in response to a new message generated in the voice mailbox according to an embodiment of the invention.

Referring to FIG. 2, there is shown a method in which the calling user leaves a message in the voice mailbox of the called user and the called user is notified in response to the newly generated message.

At process 200, the PoC server determines to connect to the voice mailbox of a called user.

At process 210, the PoC server sends a session request to the voice mailbox, and if a response message is received and the calling user decides to leave a message, performs control for the calling user to leave the message to the voice mailbox.

For the detailed method in which the calling user leaves a message to the voice mailbox of the called user, reference may be made to the method shown in FIG. 1.

At process 220, in response to a new message recording generated in the voice mailbox, the IAB setting of the called user is checked to judge whether the called user bars the instant notification. If yes, the method proceeds to process 230; otherwise, the method proceeds to process 240.

At process 230, a text notification message, including the voice mailbox's ID and the message recording's ID, is sent to the user of the voice mailbox (it is realized by an SIP MESSAGE request, referring to [RFC3428]), and then the method proceeds to process 250.

At process 240, an instant notification message, including the voice mailbox's ID and the message recording's ID, is sent to the user of the voice mailbox.

At process 250: in response to receiving the instant notification message, the user selects to receive the message by pressing at least one key.

At process 260, the terminal of the user sends a session request message to the voice mailbox, in which case the called ID in the message is the voice mailbox's ID, and the message carries the message recording's ID.

At process 270, a session connection is established between the voice mailbox and the user's terminal, the voice recording specified by the message recording's ID is played, and the session is terminated after the playback.

If there is no message recording's ID in the notification message, the voice mailbox may select to play from the first message, or may rely on the user to select what to play after the user accesses the voice mailbox, or may play no message.

In the above method, the notification message may be generated by the voice mailbox itself, and the voice mailbox sends the notification in response to a newly generated message. Alternatively, the notification message may be generated by a control function server in the established session, in which case the control function server determines whether a new message is generated based on the access mode of the called user's voice mailbox and whether a voice stream has been sent to the voice mailbox. Alternatively, the notification message may be generated by a participation function server corresponding to the user's voice mailbox in the session, in which case the participation function server determines whether a new message is generated based on the access mode of the called user's voice mailbox and whether a voice stream has been sent to the voice mailbox.

The determination on the IAB is made by the participation function server. The instant notification message, generated by the control function server in response to the voice message, is converted into a text message and sent out by the participation function server if the user set the IAB.

In the way of notifying as described in the above, the user may receive a notification in time if a new message is generated in the voice mailbox, and the user may access the voice mailbox to receive the message immediately in response to the notification by pressing a key. Therefore, it is very convenient for the user.

Figure 3:
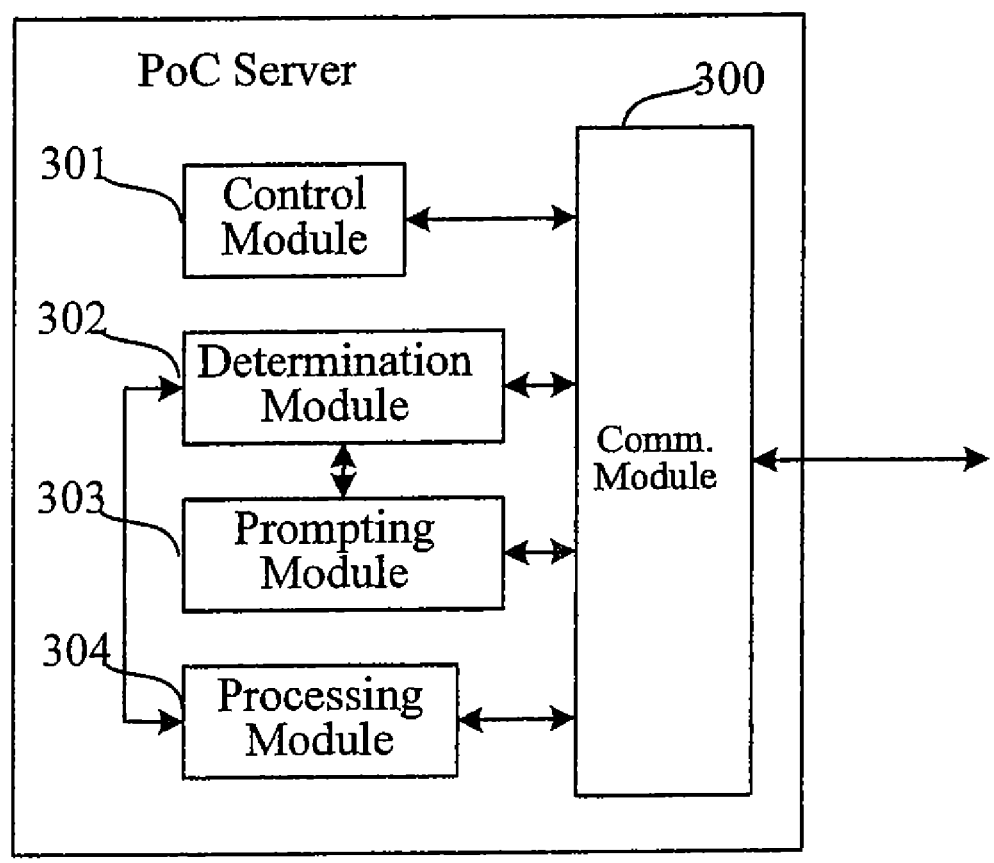
FIG. 3 is a schematically structural representation of a PoC server according to an embodiment of the invention.

Correspondingly, a PoC service server according to an embodiment of the invention is shown in FIG. 3, and includes a communication module 300, a control module 301, a determination module 302, a prompting module 303 and a processing module 304. The communication module 300 receives and transmits various messages. The control module 301 manages the communication module 300 to send a session request to the voice mailbox after a session establishment request is received from a calling user and it is determined to connect to the voice mailbox of a called user. The determination module 302 determines whether the session type of the present session is of one-to-one session type or one-to-many session type in response to receiving a response message from the voice mailbox. If the session is of one-to-one session type, the prompting module 303 plays a voice prompt to the user. The processing module 304 manages the voice mailbox to record a message left by the user if the user selects to leave the message or if the session is of one-to-many session type, or performs control to terminate the session with the voice mailbox if the user selects to leave no message. In the above method, all the determinations may be made by the determination module 302. For example, before the session request is sent to the voice mailbox, the determination module 302 may firstly determine whether the voice mailbox of the called user is available; if yes, it notifies the control module 301; otherwise, the call to the called user is terminated.

Figure 4:
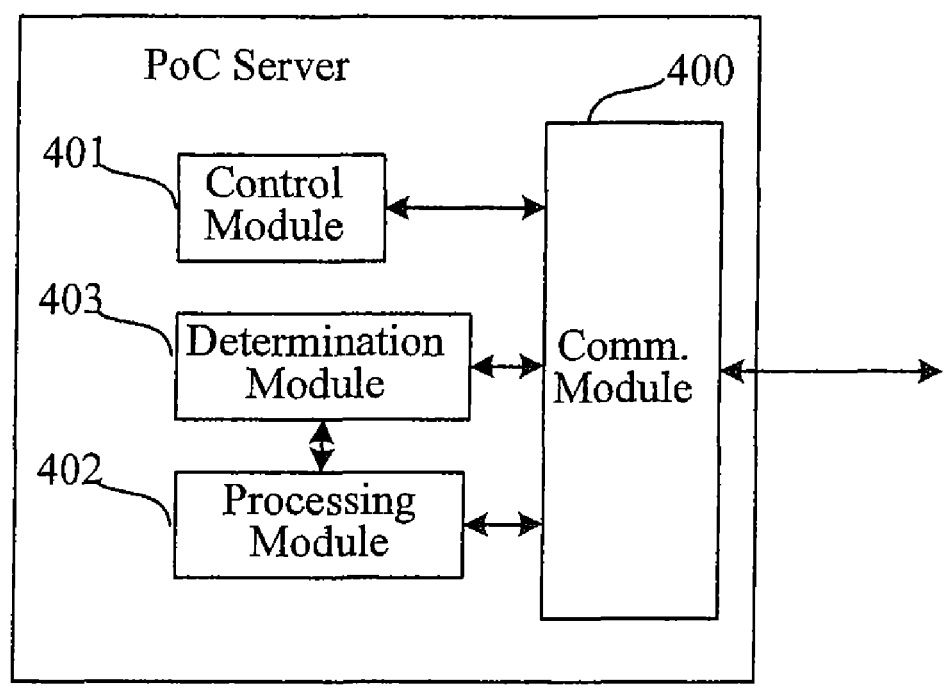
FIG. 4 is a schematically structural representation of a PoC server according to another embodiment of the invention.

Another PoC service server according to an embodiment of the invention is shown in FIG. 4, and includes a communication module 400, a control module 401, a processing module 402 and a determination module 403. The communication module 400 receives and transmits various messages. The control module 401 manages the communication module 400 to send a session request to the voice mailbox after a session establishment request is received from a calling user and it is determined to connect to the voice mailbox of a called user. The processing module 402 performs control, in response to receiving a response message, so that the calling user leaves a message to the voice mailbox. The determination module 403 determines, in response to a new message recording generated in the voice mailbox, whether the called user bars the instant notification; if yes, it manages the communication module 400 to send a text notification message to the called user; otherwise, it manages the communication module 400 to send an instant notification message to the called user. In the above method, all the determinations may be made by the determination module 403. For example, before the session request is sent to the voice mailbox, the determination module 403 may firstly determine whether the voice mailbox of the called user is available; if yes, it notifies the control module 401; otherwise, the call to the called user is terminated. In another example, in response to receiving a response message from the voice mailbox, the determination module 401 determines the session type of the present session, and a voice prompt is played to the user via the communication module 400 if it is determined that the session is a one-to-one session.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. A method of providing a voice mailbox function in a Push-To-Talk over Cellular (PoC) service, comprising:
    if a voice mailbox of at least one called user is to be connected in response to receiving a session establishment request from a calling user, determining whether the session corresponding to the session establishment request is a one-to-many session; and recording a message from the calling user in the voice mailbox if the session is a one-to-many session; and
    if the session is a one-to-one session, playing a voice prompt to the calling user; and recording a message from the calling user in the voice mailbox if the calling user selects to leave the message.

2. The method according to claim 1, further comprising:
  determining whether a voice recording of the voice mailbox is to be played based on a response message from the voice mailbox; and
  if the voice recording should be played, playing the voice recording by assigning a floor to the voice mailbox.

3. The method according to claim 2, further comprising: after playing the voice recording,
  determining whether an access mode of the voice mailbox is playback access only based on the response message; and
  if the access mode is playback access only, terminating the session with the voice mailbox.

4. The method according to claim 2, wherein, the voice mailbox comprises more than one voice mailbox, and the voice recordings of the more than one voice mailbox are played by assigning the floor in turn.

5. A Push-To-Talk over Cellular (PoC) service server, comprising:
  a communication module, for receiving and transmitting messages;
  a control module, for determining whether to connect to a voice mailbox of at least one called user in response to receiving a session establishment request from a calling user, and for managing the communication module to send a session request to the voice mailbox;
  a determination module, for determining whether a session is of one-to-one session type or one-to-many session type in response to receiving a response message from the voice mailbox;
  a prompting module, for playing a voice prompt to the calling user if the session is of one-to-one session type; and
  a processing module, for managing the voice mailbox to record a message left by the calling user if the user selects to leave a message or if the session is of one-to-many session type, or to terminate the session with the voice mailbox if the calling user selects to leave no message.

6. The PoC service server according to claim 5, wherein, before the session request is sent to the voice mailbox, the determination module determines whether the voice mailbox of the called user is available, and if the voice mailbox of the called user is available, the control module is notified; otherwise, a call to the called user is terminated.

\* \* \* \* \*